United States Patent Office.

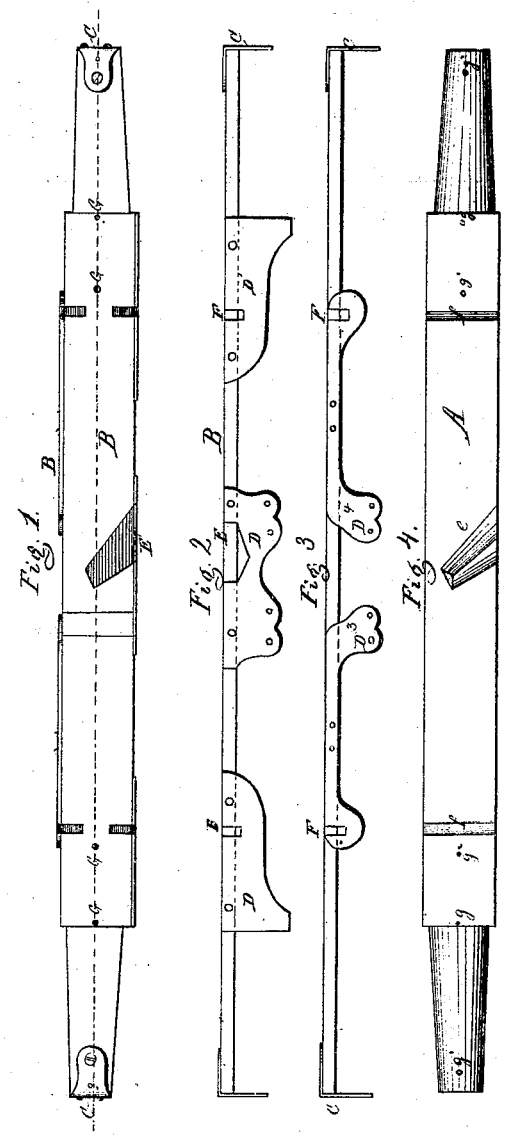

PETER GEISER, OF WAYNESBOROUGH, PENNSYLVANIA.

Letters Patent No. 92,817, dated July 20, 1869.

IMPROVEMENT IN GAUGES FOR MAKING AXLES.

The Schedule referred to in these Letters Patent and making part of the same.

*To all whom it may concern:*

Be it known that I, PETER GEISER, of Waynesborough, in the county of Franklin, and State of Pennsylvania, have invented a new and useful Improvement in Gauges for Making Axles of triple-gear horse-powers; and I do hereby declare that the following is a full, clear, and exact description of the same, reference being had to the annexed drawings, making part of this specification, in which—

Figure 1 is a top view;
Figure 2 is a side elevation;
Figure 3 is an elevation of the opposite side; and
Figure 4 is a top view of the axle as finished.

The same letters, in all the figures, refer to identical parts.

This invention relates to a gauge or templet for laying off the work to be done upon the axles of triple-gear horse-powers, by means of which the points to be cut or bored, as well as the centre of the spindle, are determined and marked out.

A, in fig. 4, shows the axle as completed.

The gauge is constructed of a thin piece of board, B, on the end of which are metallic plates C C, having holes through them to indicate the precise position of the centres of the spindles.

Metallic plates D, $D^1$, $D^2$, $D^3$, and $D^4$, are bolted to the edge of the board B, having holes at such points as are to be the centres of bolt-holes, for the insertion of bolts through the axle.

The slot at E represents the position and form of the notch $e$, which is intended to receive the cross-sill.

The notches at F indicate the position and dimensions of the gains $f$, and a series of holes, G, indicates the position of the vertical bolt-holes $g$.

I am aware that templets have been used in various forms for laying out various kinds of work to be done, and I therefore confine my claim to the peculiar construction of this, by means of which the timber may be properly marked for the workman, and the spindle also centred.

What I claim as my invention, and desire to secure by Letters Patent, is—

The described templet or gauge for marking the timbers, and also at the same time centring the spindles of axles, substantially as set forth.

In testimony whereof, I have signed my name to this specification, in the presence of two subscribing witnesses.

PETER GEISER.

Witnesses:
R. MASON,
C. F. CLAUSEN.